US007877123B2

(12) United States Patent
Abdul-Gaffoor et al.

(10) Patent No.: US 7,877,123 B2
(45) Date of Patent: Jan. 25, 2011

(54) METHOD AND APPARATUS FOR RF SIGNAL TRANSMISSION IN A SLIDER PHONE

(75) Inventors: Mohammed R. Abdul-Gaffoor, Palatine, IL (US); Minh Duong, Lake Bluff, IL (US); Souvik Ghosh, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 600 days.

(21) Appl. No.: 11/864,010

(22) Filed: Sep. 28, 2007

(65) Prior Publication Data

US 2009/0085696 A1    Apr. 2, 2009

(51) Int. Cl.
*H04M 1/00* (2006.01)

(52) U.S. Cl. .................. 455/575.4; 455/41.1; 455/41.2; 455/575.1; 455/90.3

(58) Field of Classification Search ............. 455/575.4, 455/556.1, 292, 425, 420, 14, 15, 41.2, 90.3, 455/575.6, 575.8, 3.06, 575.1, 41.1; 385/37, 385/31; 343/700, 702
See application file for complete search history.

(56) References Cited

U.S. PATENT DOCUMENTS

| 5,014,346 | A | 5/1991 | Phillips et al. | |
|---|---|---|---|---|
| 2008/0001829 | A1* | 1/2008 | Rahola et al. | 343/702 |
| 2008/0039009 | A1* | 2/2008 | Symons et al. | 455/3.06 |
| 2008/0253070 | A1* | 10/2008 | Rissanen et al. | 361/681 |
| 2009/0110352 | A1* | 4/2009 | Schorpp et al. | 385/37 |
| 2009/0213914 | A1* | 8/2009 | Dong et al. | 375/219 |
| 2010/0133952 | A1* | 6/2010 | Bang et al. | 310/309 |

* cited by examiner

*Primary Examiner*—Tan Trinh

(57) ABSTRACT

A method and apparatus for internal RF signal transmission between the fixed base portion and the sliding portion of a mobile communication terminal using capacitive coupling are disclosed. The method and apparatus provide internal RF signal transmission when the sliding portion is open (SO) and when the sliding portion is closed (SC). The method for internal RF signal transmission in a mobile communication terminal includes a first capacitor plate for forming a first capacitor when the two parts are at a first position relative to each other and for forming a second capacitor when the two parts are at a second position relative to each other.

15 Claims, 6 Drawing Sheets

METHOD AND APPARATUS FOR RF SIGNAL TRANSMISSION IN A SLIDER PHONE

BACKGROUND OF THE INVENTION

1. Field of the Invention

The invention relates generally to the transfer of signals between objects that move relative to one another and, more particularly, to RF signal transmission between the fixed base portion and the sliding portion of a slider phone using capacitive coupling that provides RF signal transmission when the slider is fully open and closed.

2. Introduction

Slider Form Factor has become increasingly popular for cell phones or portable communication devices. More applications are added into cell phones requiring more antennas for these different applications and their associated radio frequency (RF) transceiver circuits. Due to the reduction in size of these devices, it becomes more difficult to have all antennas and their associated transceiver circuits confined exclusively to one particular area of the communication device.

Placing an antenna and its associated transceiver circuit in different parts, for example an antenna in the slider part and the transceiver part in the fixed base, requires a RF signal transmission path between the slider and the fixed base. In most slider phones, a flex circuit is used to transmit base band low frequency signals. This flex circuit is not suitable for transmitting RF signal. In this situation, an additional interconnection path using a coaxial cable may be used. However, the use of coaxial cable adds to the complexity of the antenna chassis structure and also to the mechanical complexity/size of the sliding arrangement.

The patent to Phillips Et. Al. (U.S. Pat. No. 5,014,346) describes a method of rotatable inductive coupling of RF signals between a transceiver circuit and an antenna at different parts of the portable communication device. This was applicable for hinged or rotatable devices like clamshell phones or phones with a rotatable flip. While coaxial cable is good for RF signal transmission it severely complicates chassis design and adds to the mechanical complexity.

For the reasons stated above, and for other reasons stated below which will become apparent to those skilled in the art upon reading and understanding the present specification, there is a need in the art for RF signal transmission between the fixed base part and the slider part of a slider phone that does not severely complicate chassis design or add to the mechanical complexity of the phone. There is also a need for improved internal RF signal transmission that does not require electrical contact or concentric conductors between the base part and the sliding part of a slider phone.

SUMMARY OF THE INVENTION

A method and apparatus for internal RF signal transmission between the fixed base portion and the sliding portion of a mobile communication terminal using capacitive coupling are disclosed. The method and apparatus provide internal RF signal transmission when the sliding portion is open (SO) and when the sliding portion is closed (SC). The method for internal RF signal transmission in a mobile communication terminal includes a first capacitor plate for forming a first capacitor when the two parts are at a first position relative to each other and for forming a second capacitor when the two parts are at a second position relative to each other.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

This invention concerns RF signal transmission between a fixed base portion and a sliding portion of a slider phone using capacitive coupling when the slider portion is fully open and closed.

Figure 1:
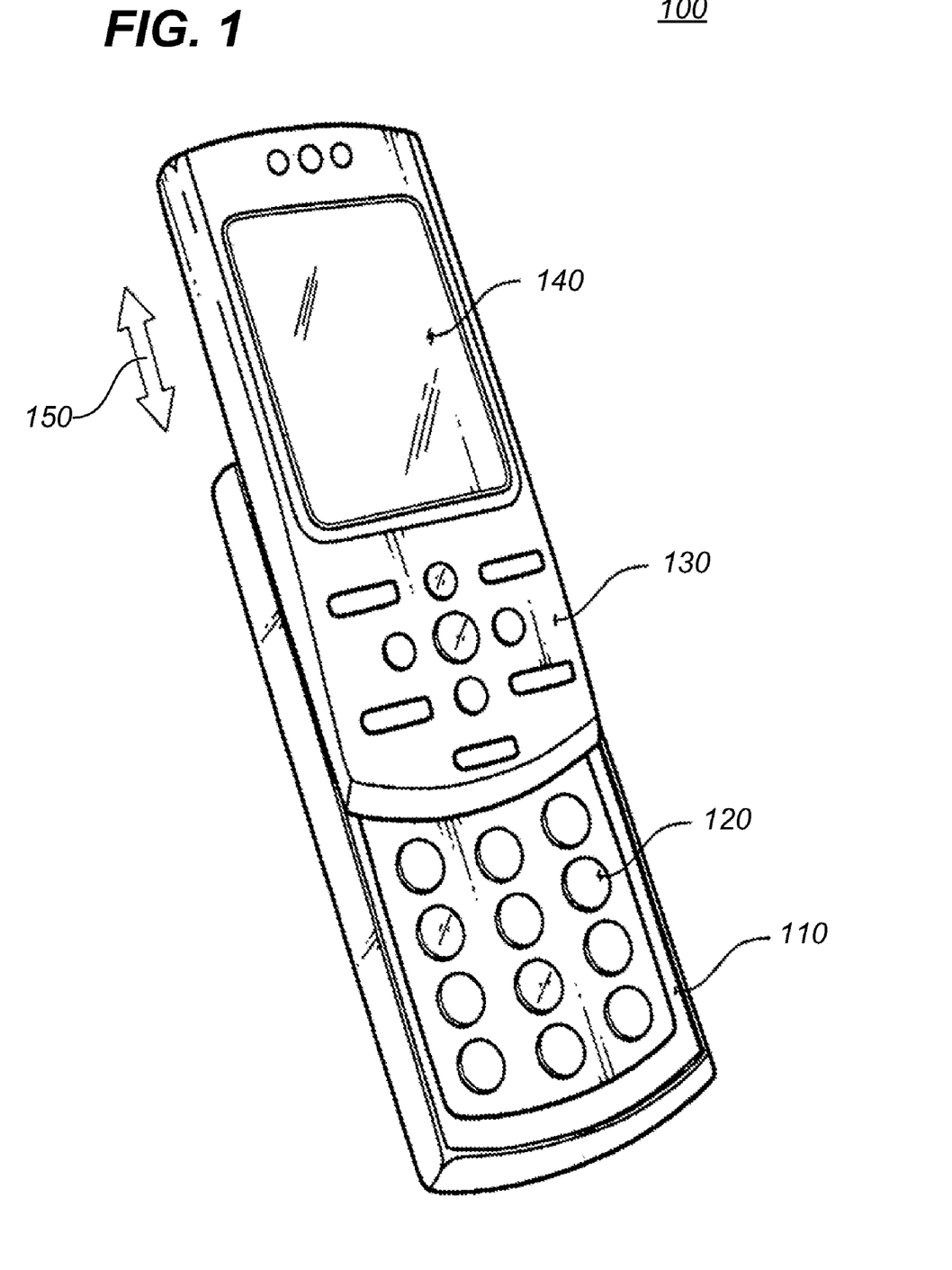
FIG. 1 illustrates a perspective view of a phone having a slider assembly in accordance with a possible embodiment of the invention.

FIG. 1 illustrates an exemplary diagram of electronic device 100 in accordance with a possible embodiment of the invention. In particular, the electronic device 100 is a slider phone that includes a main body or a fixed base part 110 on which a plurality of keys 120 are installed, and a movable part or slider part 130 installed slidably over a surface of the fixed base part 110 on which the keys 120 are installed. The keys 120 function as an input device for interacting with electronic device 100. An output device 140 such as a display is installed on a front surface of the slider part 130. Direction 150 shows the movement of the slider part 130.

The slider part 130 moves in an up or down direction 150 to give the user access to keys 120. When the slider part 130 is substantially down, the slider phone is considered close. When the slider part 130 is substantially up, the slider phone is open. The slider phone 100 is at a first predetermined position when close and at a second predetermined position when open. The movement of the slider part is accomplished through an assembly. The assembly (not shown) is a railing system that can be motorized with a micro-motor and controller or manually actuated when a force is applied in the direction of movement 150. A typical assembly whether manual or motorized usually comprises a fixing plate fixed to the base part 110 of the electronic device 100, a sliding plate fixed to the sliding part, and an up/down positioning mechanism including one end hinged to the fixing plate and the other end hinged to the sliding plate to change a direction of a force 150 for pushing the sliding plate from a specific sliding location (open or close) of the sliding plate. Guide grooves and guide bars for guiding the sliding movement 150 are formed at both sides of the fixing plate and sliding plate.

Input device 120 may include one or more conventional mechanisms that permit a user to input information to slider phone 100, such as a keyboard, a mouse, a pen, a voice recognition device, etc. Output device 140 may include one or more conventional mechanisms that output information to the user, including a display, a printer, one or more speakers, or a medium, such as a memory, or a magnetic or optical disk and a corresponding disk drive.

Figure 2:
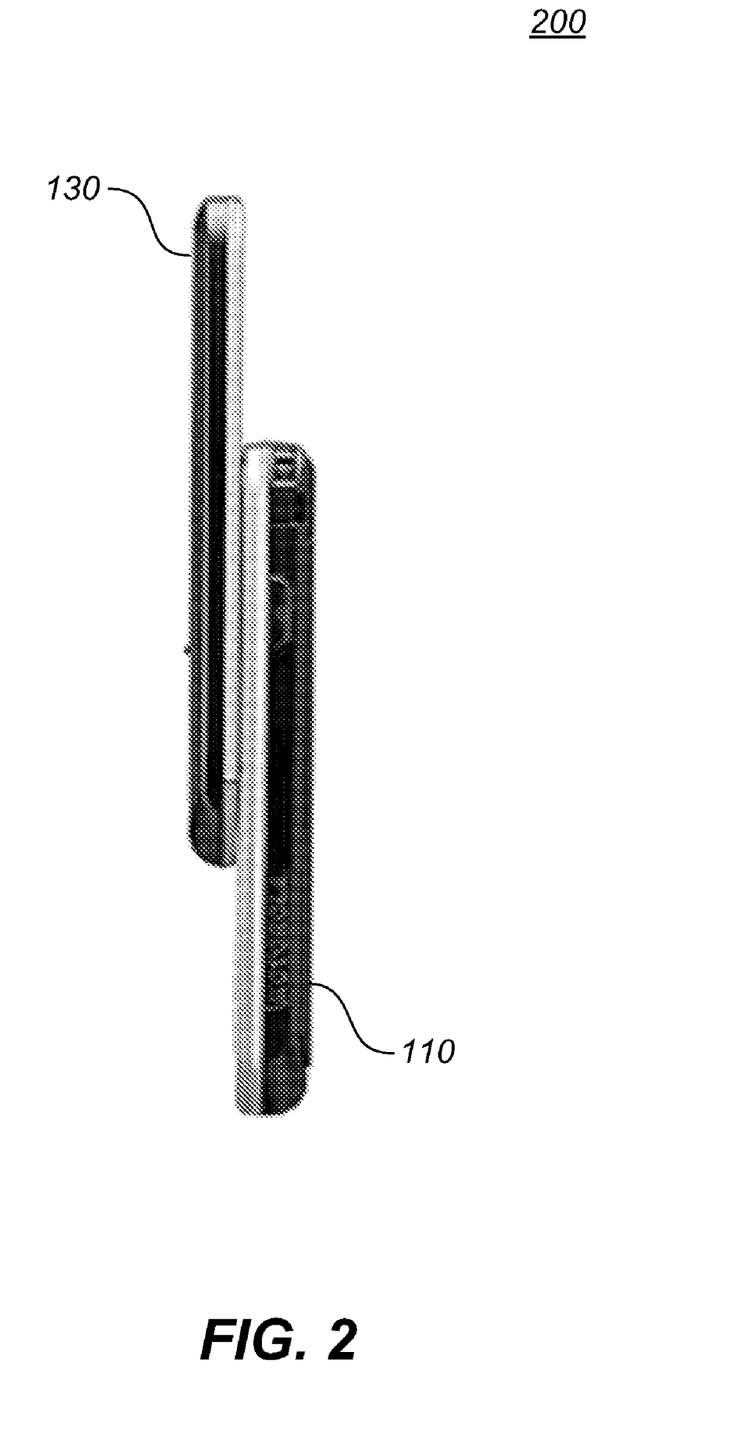
FIG. 2 illustrates an exemplary diagram of a side view of a phone having a slider assembly in accordance with a possible embodiment of the invention.

FIG. 2 shows a side view 200 of the slider phone depicted in FIG. 1. The depiction shows the slider part 130 and the base part 110.

Figure 3:
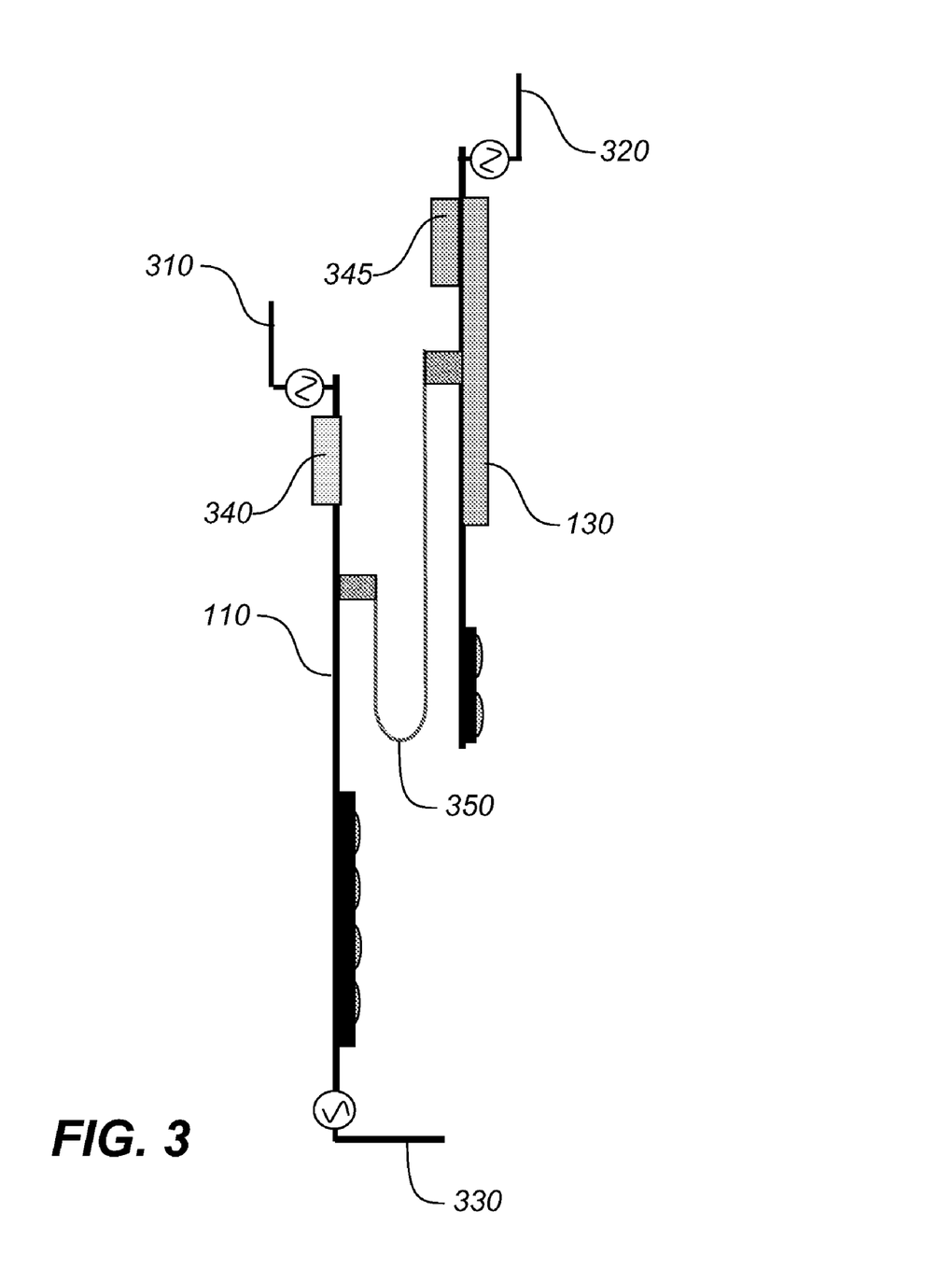
FIG. 3 illustrates a block diagram of an exemplary of a phone having a slider assembly in accordance with a possible embodiment of the invention.

FIG. 3 illustrates an exemplary slider phone 300 having multiple antennas (310, 320, 330), or device which may implement one or more modules or functions of wireless communication process. The slider phone 300 includes antennas 310-330, transceiver circuit 340-345, slider flex 350, base part 110, and slider part 130. While not shown the slider phone 300 may include a bus, a processor, a memory, a read only memory (ROM), and a storage device. A Bus or flex cable 350 may permit communication among the components of the slider phone 300. A flex cable may also be referred to as a flex circuit or a ribbon cable. A flex cable 350 typically comprises a plurality of conductive traces or channels embedded, laminated, or printed on or in a flexible molding structure such as a plastic or polymer film or dielectric or insulating material. The flex circuit 350 is best suited for base band or low frequency signals. The Processor may include at least one conventional processor or microprocessor that interprets and executes instructions. The Memory may be a random access memory (RAM) or another type of dynamic storage device that stores information and instructions for execution by processor. The Memory may also store temporary variables or other intermediate information used during execution of instructions by processor. The ROM may include a conventional ROM device or another type of static storage device that stores static information and instructions for the processor. Storage device may include any type of media, such as, for example, magnetic or optical recording media and its corresponding drive.

A Communication interface may include any transceiver-like mechanism 340 and 345 that enables the slider phone to communicate via a network. For example, communication interface may include a modem, or an Ethernet interface for communicating via a local area network (LAN). Alternatively, communication interface may include other mechanisms for communicating with other devices and/or systems via wired, wireless or optical connections. The transceiver device 340 can perform the functionality of a receiver and a transmitter. Further, transceiver devices can be any device that transmits radio frequency signals, receives radio frequency signals, or both transmit and receive radio frequency signals. It should be appreciated by one of ordinary skill in the art that other similar electronic block diagrams of the same or alternate type can be utilized for the slider phone 300 to handle the requirements of slider phone 300.

The slider phone 300 may perform functions in response to the processor by executing sequences of instructions contained in a computer-readable medium, such as, for example, memory, a magnetic disk, or an optical disk. Such instructions may be read into memory from another computer-readable medium, such as storage device, or from a separate device via communication interface.

The slider phone 300 is able to accommodate added applications such diversity, DVB-H, WIFI, and Bluetooth with antennas 310, 320, and 330. Due to the shrinking in size of the slider phone 300 it becomes difficult to have all the antennas and its associated transceiver in the same part of the device. Placing a transceiver such as transceiver 345 near display 140 adds other issues to the operation of flex phone 300 leading to degradation of signal quality and creating interference at display 140. To accommodate the shrinking size of flex phone 300 and yet be able to accommodate multiple antennas (310-330) the antenna and its associated transceiver circuit need to be placed in different parts. Since the transceiver and the antennas are in different parts, the signal of the transceiver 340 needs to be routed within the slider phone 300. The slider flex 350 is not suitable for transmitting radio frequency (RF) signals. A coaxial cable between the base part 130 and the slider part 110 adds to the complexity and does not make efficient use of real estate/volume in slider phone 300. FIG. 3, illustrated therein is one embodiment of a portable electronic device 300 having an antenna structure and associated circuitry in accordance with the invention. The device 300 includes electrical circuit disposed in the slider part 130 and second electrical circuit disposed in the base part 110 of the device 300. The overall housing of the device 300 includes a major axis running the length of the device 300, and a minor axis running the width of the device 300. The antennas 310, 320, 330 are employed to receive radio frequency signals and to deliver them to circuit components on either the first electrical circuit or second electrical circuit, depending upon the configuration of the particular device.

Figure 4:
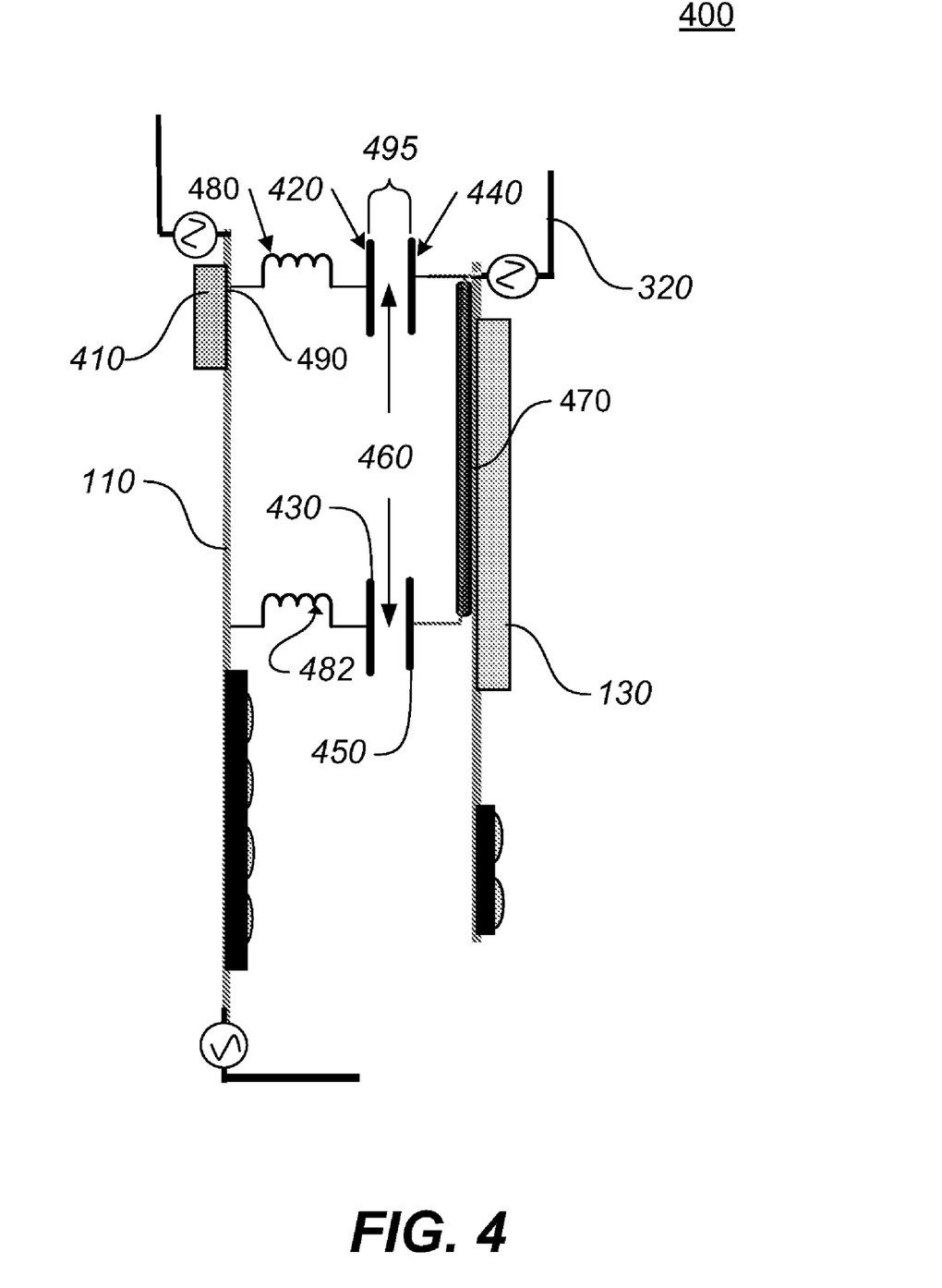
FIG. 4 illustrates a block diagram of an arrangement for a first circuit for RF signal transmission in a phone having a slider assembly in accordance with a possible embodiment of the invention.

FIG. 4 illustrates an exemplary diagram of slider phone 400 in accordance with a possible embodiment of the invention. Slider phone 400 meets the need in the art for RF signal transmission with efficient use of real estate/volume. As shown slider phone 400 would be in a close position. In particular, slider phone 400 includes a transceiver 410, optional inductors or coils such as inductor 480 and inductor 482 a first capacitor plate 420, a second capacitor plate 430, a third capacitor plate 440, a fourth capacitor plate 450, and transmission line 470. Inductor 482 is attached to a ground node or any tunable impedance load at base part 110. The space between the first and second capacitor plates (420, 430) or between the third and fourth capacitor plates (440, 450) is represented by distance 460. Distance 460 can be set to the open/close travel distance of slider part 130 by simply moving the respective capacitor plates. Capacitor plate 420 is a first stationary, capacitive plate and capacitor plate 430 is a second stationary, capacitive plate to denote capacitor plates that are in the base part 110 of slider phone 400. Capacitor plate 440 is a third stationary, capacitive plate and capacitor plate 450 is a fourth stationary, capacitive plate to denote capacitor plates that are in the movable part or slider part 130 of slider phone 400. A flex cable 350 to permit communication among the components of the slider phone may be present but not shown in FIG. 4 for clarity.

In operation transceiver circuit 410 introduces a signal into RF signal transceiver input node 490. Transceiver circuit 410 can be any RF generating unit that can produce a radio frequency signal. The signal then follows a first path through L-C circuit consisting of inductor 480, first capacitor plate 420, and third capacitor plate 440. The first and third capacitor plates form a first parallel plate capacitor 495. The first and fourth capacitor plates form a second parallel plate capacitor 510 in FIG. 5. When signals flow through the first and third capacitor plates (420,440) this is called a first circuit for RF signal transmission or forming a first transmission path since the movement of the slider part forms the circuit or the path for the signal to flow. When the signal flows from the first and fourth capacitor plates through transmission line 470 this is called a second transmission path or a second circuit for RF signal transmission since that is the path taken by a signal from transceiver circuit 410 to antenna 320. There are three critical factors determinant of the amount of capacitance created by plates 420 and 440 and 430 and 450, and then when the slider part 130 is upward plates 420 and 450. These critical factors all dictate capacitance by affecting how much electric field flux will develop for a given amount of electric field force: (a) area of each plate contributes to capacitance value with smaller area having less capacitance; the gap or spacing between the plates determines effects capacitance value with an increase of inter-spacing giving less capacitance; and, (c) the dielectric material between the plates effects capacitance value.

Slider phone 400 as shown in FIG. 4 is the close position. The base part and the movable part (slider) are at a first predetermined position relative to each other. The first parallel capacitor (420, 440) in series with inductor 480 resonates at the frequency of operation, thereby transferring signal from the transceiver 410 in the fixed base 110 to the antenna 320 in the slider part 130. The parallel capacitor from capacitor plates 430 and 450 in series with inductor 490 is transformed through the predetermined distance of transmission line 470 to an open circuit. In the simplest case, at the desired frequency, if parallel capacitor (430, 450) resonates with the inductor to form a short circuit, then a quarter wavelength of the transmission line 470 will transform this short circuit to an open circuit. In the close position the signal at RF input node 490 travels to antenna 320 since at the desired frequency the transmission line 470 appears to the signal at RF transceiver input node 490 as an open line. The values of capacitors and inductors are dependent on the frequency of operation. The inductors may be distributed on either side of the plates forming the capacitors. The inductors may be fixed or tunable depending upon the frequency of operation. Furthermore, the inductors may not be necessary at all, when the capacitors have very high values or infinity (as would be in the case of physical contact between the plates). As noted earlier the values of the parallel capacitors can be controlled based on the dimension of the plates, the distance of each respective plate, and the dielectric between the plates.

Figure 5:
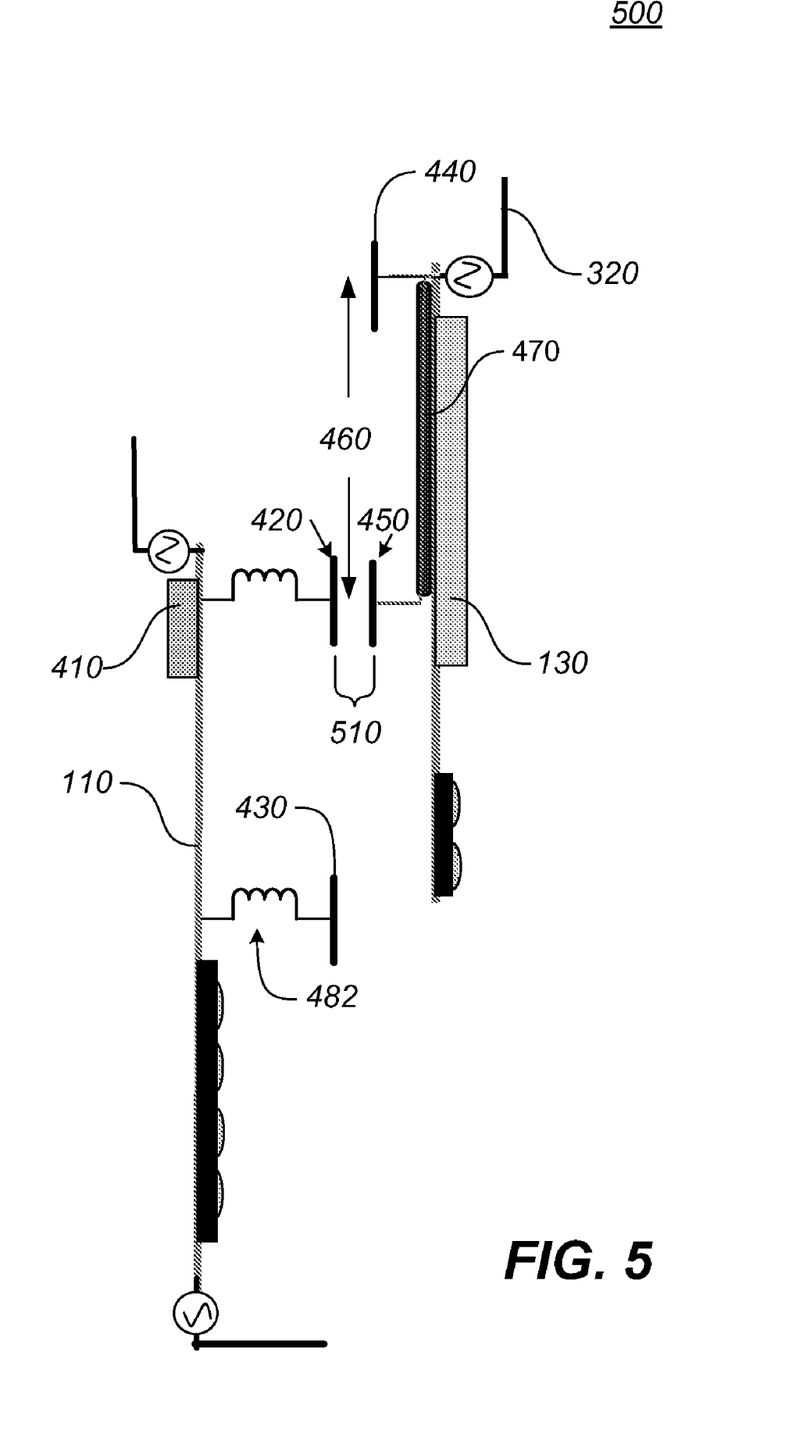
FIG. 5 illustrates a block diagram of an arrangement for a second circuit for RF signal transmission in a phone having a slider assembly in accordance with a possible embodiment of the invention.

FIG. 5 illustrates an exemplary diagram of slider phone 500 in accordance with a possible embodiment of the invention. Slider phone 500 meets the need in the art for RF signal transmission with efficient use of real estate/volume. As shown slider phone 500 would be in an open position. A motion mechanism would drive the slider away from keys 120 as shown in FIG. 1 in an upward motion. As those in the art know, a slider assembly is commonly found in slider phones and comprises a fixed plate formed with a guide section for guiding the linear motion of sliding part 130 and it is usually affixed to the surface of a main body of the sliding-type cellular phone. The motion mechanism can be the force exerted by the user of slider phone 500, a micro-motor or any other device that can cause a force to be applied to slider part 130 causing it to change its position. Capacitor plate 420 and capacitor plate 450 form parallel capacitor 510. Each capacitor plate 420, 440, 430, and 440 may include a layer of dielectric material to separate the two dielectric plates when the parallel capacitors 495 or 510 activated or formed. It is understood that the dielectric material may be formed on a single one of the capacitor plates rather than on both plates. A signal from transceiver circuit 410 at RF signal transceiver input node 490 flows through inductor 480 to parallel capacitor 510 through transmission line 470 to RF signal receiver input node at antenna 320. Parallel capacitor 510 and inductor 480 resonate at the frequency of operation. The RF signal is transferred through the resonant circuit to the slider part 130 of slider phone 500 and continue through transmission line 470 to antenna 320. The dynamic changing of circuits (410, 510, 470, 320) or transmission paths based on the sliding action 150 of a slider phone 500 to realize two different capacitance (495, 510) coupling paths and ensuring that the path used for one state does not interfere with the signal coupling in the other state provides the advantage of avoiding reliability concerns due to connecting two moving parts, provides considerable latitude in architecting and making efficient use of real estate/volume in slider phones, and enables thin slider phones without the need for electrical contact or concentric conductors between the base part and the sliding part. Additionally, since the natural movement of the slider part 130 causes the formation of the first and second circuits there is no need to employ sensing means such as Hall Effect sensors to determine when the phone is open or close. While the invention has been described with slider phones 100-500 it should be understood that the use of capacitor plates in the manner described herein is applicable to other mobile communication terminals. The transmission path described so far is for the transmission from the transceiver 410 located at the fixed base 110 to the antenna 320 in the movable slider 130. The direction of the signal flow can be reversed as in the case of receiving signals from the antenna to the transceiver. Furthermore, the location of transceiver and the antenna can be interchanged as well.

Figure 6:
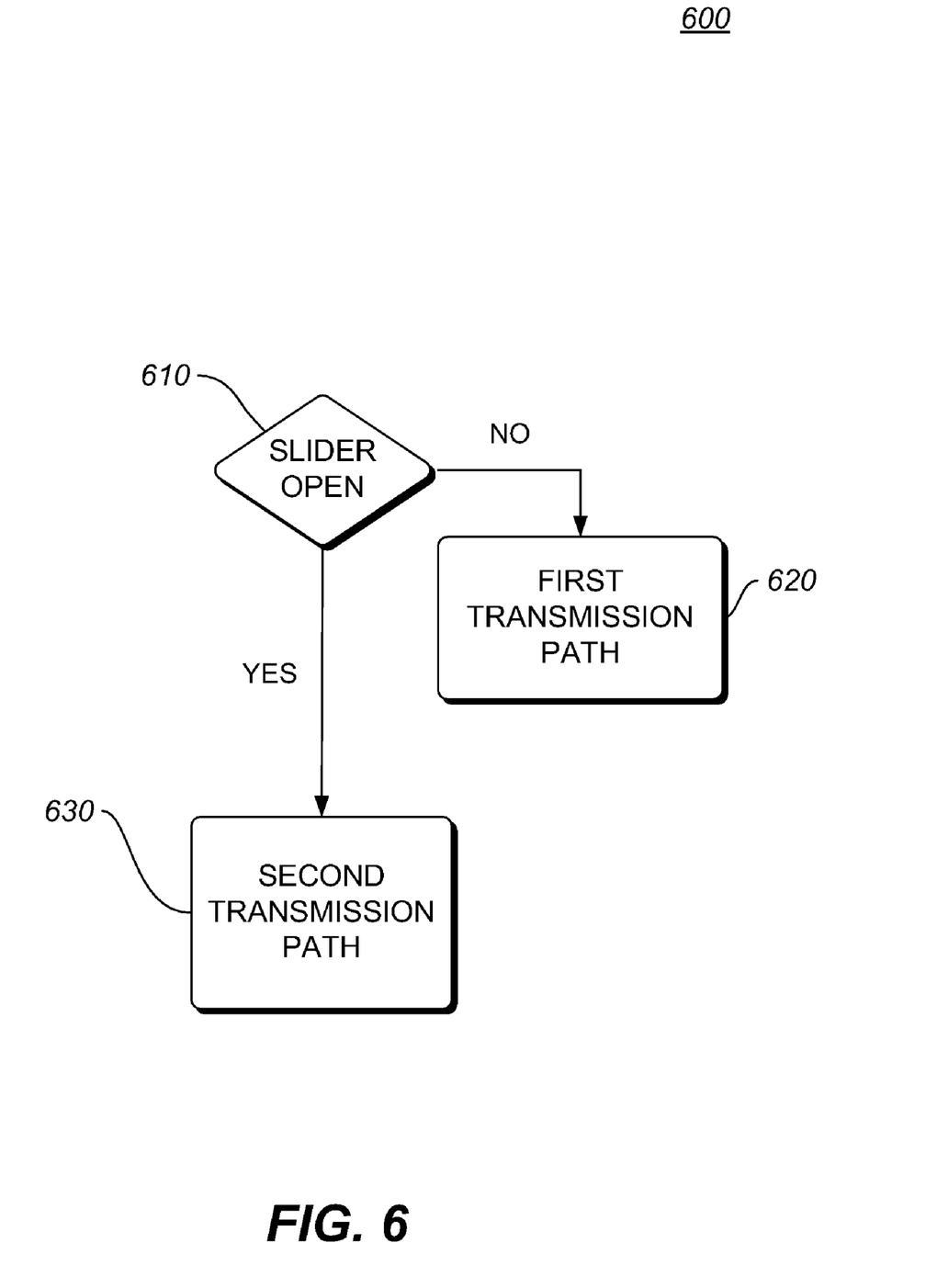
FIG. 6 is an exemplary flowchart illustrating a method to select an RF signal transmission path in accordance with one possible embodiment of the invention.

FIG. 6 illustrates an exemplary transmission path selection process 600 in accordance with a possible embodiment of the invention. The steps of the method are dependent upon the position of the slider part. Beginning with step 610 when the slider is not open (close) a first transmission path 620 is used to route the signal from the transceiver 480 to antenna 320. Thus, in a close position the signals would go through parallel capacitor 495 formed by capacitor plates 420 and 440. When the slider is open, a second transmission path 630 is used to route the signal from the transceiver circuit 410 to antenna 320. The second transmission path 630 would route the RF signals through a parallel capacitor formed with capacitor plates 420 and 450 and through transmission line 470. It is anticipated that process 600 is selected based on the position of the slider part and requires only a user or other driving mechanism to perform the selection of the transmission path.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. It does not necessarily need to be one system used by all end users. Accordingly, the appended claims and their legal equivalents should only define the invention, rather than any specific examples given.

We claim:

1. A method to internally transmit/receive an RF signal in a mobile communication terminal comprising:
    forming a first transmission path for mobile communication terminal electrical signals when a base portion and a movable portion are at a first relative position;
    forming a second transmission path for mobile communication terminal electrical signals when the base portion and the movable portion are at a second relative position;
    providing a first stationary, capacitive plate on one of the base portion and the movable portion;
    providing a second stationary, capacitive plate on the one of the base portion and the movable portion, the second stationary, capacitive plate spaced a predetermined distance from the first stationary, capacitive plate;
    providing a third stationary, capacitive plate on an other of the base portion and the movable portion;
    wherein the first transmission path includes the first stationary, capacitive plate on the one of the base portion and the movable portion and includes the third stationary, capacitive plate on the other of the base portion and the movable portion, and
    wherein the second transmission path includes the second stationary, capacitive plate on the one of the base portion and the movable portion and includes the third stationary, capacitive plate on the other of the movable portion and the base portion.

2. The method of claim 1, the method further comprising:
    providing a fourth stationary, capacitive plate on the movable portion spaced a predetermined distance from the third stationary, capacitive plate; and
    providing a transmission line coupling third stationary, capacitive plate and the fourth stationary, capacitive plate.

3. The method of claim 2, wherein the first transmission path includes the first stationary, capacitive plate on the base portion and the third stationary, capacitive plate on the movable portion.

4. The method of claim 2, wherein the second transmission path includes the first stationary, capacitive plate on the base portion, the third stationary, capacitive plate on the movable portion, and the transmission line.

5. The method of claim 1, wherein the second stationary, capacitive plate, the fourth stationary, capacitive plate, and the transmission line form an open circuit 6. The method of claim 1, wherein an RF transceiver unit is coupled to the first stationary, capacitive plate on the base portion.

7. An apparatus for RF signal transmission in a mobile communication terminal having a base portion and a movable portion, the apparatus comprising:
    a first circuit for RF signal transmission when the base portion and the movable portion are at a first relative position;
    a second circuit for RF signal transmission when the base portion and the movable portion are at a second relative position;
    an RF generating unit for driving an RF signal through the first circuit at the first relative position and for driving an RF signal through the second circuit at the second relative position;
    a first stationary, capacitive plate on the base portion;
    a second stationary, capacitive plate on the base portion spaced a predetermined distance from the first stationary, capacitive plate;
    a third stationary, capacitive plate on the movable portion;
    a fourth stationary, capacitive plate on the movable portion spaced a predetermined distance from the third stationary, capacitive plate; and
    a transmission line coupling third stationary, capacitive plate and the fourth stationary, capacitive plate,
    wherein the first circuit for RF signal transmission includes the first stationary, capacitive plate on the base portion and third stationary, capacitive plate on the movable portion, and
    wherein the second circuit for RF signal transmission includes the first stationary, capacitive plate on the base portion, the fourth stationary, capacitive plate on the movable portion, and the transmission line.

8. The apparatus of claim 7, wherein the RF generating unit is coupled to the first stationary, capacitive plate on the base portion.

9. An electronic device comprising:
    a base portion including an RF signal transceiver input node;
    a movable portion including an RF signal receiver input node, where the movable portion is movable relative to the base portion;

a first capacitive plate coupled to the RF signal transceiver input node;

a second capacitive plate coupled to the RF signal receiver input node;

a third capacitive plate coupled to the RF signal receiver input node through a transmission line of predetermined distance;

a motion mechanism for causing the second and third capacitive plate to alternatingly couple with the first capacitive plate to form a first transmission path when the base portion and the movable portion are at a first relative position and to form a second transmission path when the base portion and the movable portion are at a second relative position.

10. The electronic device of claim 9, wherein the first capacitive plate is in a base part of the electronic device.

11. The electronic device of claim 9, wherein the second capacitive plate and the third capacitive plate are on a movable portion of the electronic device.

12. The electronic device of claim 9, wherein the motion mechanism moves the second capacitive plate to the first capacitive plate to form a first RF signal transmission path.

13. The electronic device of claim 9, wherein the motion mechanism moves the third capacitive plate to the first capacitive plate to form a second RF signal transmission path through the transmission line.

14. The electronic device of claim 9, the electronic device further comprising:

a RF transceiver unit for transmitting/receiving an RF signal at the transceiver input node.

15. The electronic device of claim 9, the electronic device further comprising:

a fourth capacitive plate located in the base part of the electronic device and operable to form a circuit with the third capacitive plate coupled to the RF signal receiver input node through a transmission line of predetermined distance.

* * * * *